US011982548B2

(12) United States Patent
Scheibe et al.

(10) Patent No.: US 11,982,548 B2
(45) Date of Patent: May 14, 2024

(54) SENSOR AND SENSOR ARRANGEMENT

(71) Applicant: Endress+Hauser Conducta GmbH+Co. KG, Gerlingen (DE)

(72) Inventors: Sven-Matthias Scheibe, Reichenberg (DE); Stefan Pilz, Geithain (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 537 days.

(21) Appl. No.: 17/271,804

(22) PCT Filed: Jul. 30, 2019

(86) PCT No.: PCT/EP2019/070463
§ 371 (c)(1),
(2) Date: Feb. 26, 2021

(87) PCT Pub. No.: WO2020/043414
PCT Pub. Date: Mar. 5, 2020

(65) Prior Publication Data
US 2021/0341311 A1 Nov. 4, 2021

(30) Foreign Application Priority Data
Aug. 27, 2018 (DE) ...................... 10 2018 120 878.2

(51) Int. Cl.
*G01D 5/20* (2006.01)
*G01D 11/24* (2006.01)
*H01F 38/14* (2006.01)

(52) U.S. Cl.
CPC ........... *G01D 5/204* (2013.01); *G01D 11/245* (2013.01); *H01F 38/14* (2013.01); *H01F 2038/143* (2013.01)

(58) Field of Classification Search
CPC ...... G01D 11/245; G01D 21/00; G01D 5/204; H01F 38/14; H01F 2038/143
See application file for complete search history.

(56) References Cited

U.S. PATENT DOCUMENTS 3,818,273 A * 6/1974 Nakashima ............ H02H 9/008
361/100
6,044,714 A * 4/2000 Lowell .................... G01F 1/667
73/861.28

(Continued)

FOREIGN PATENT DOCUMENTS

CN 101802943 A 8/2010
CN 103180693 A 6/2013
(Continued)

*Primary Examiner* — Jermele M Hollington
*Assistant Examiner* — Suresh K Rajaputra
(74) *Attorney, Agent, or Firm* — Mark A. Logan; Endress+Hauser (USA) Holding, Inc.

(57) ABSTRACT

Disclosed is a sensor comprising a sensor element that detects a measurand, the sensor element being in electrical contact with a sensor circuit that processes values derived from data from a secondary coil and/or from the measurand. The sensor circuit is in electrical contact with an ex-circuit. The sensor circuit is supplied a maximum input voltage and a maximum input current. The ex-circuit includes the secondary coil that receives an electrical signal from a primary coil. The electrical signal includes the data that are modulated onto the electrical signal. The sensor also includes a voltage limit that limits the voltage of the electrical signal to the maximum input voltage of the sensor circuit and a current limit that limits the current of the electrical signal to the maximum input current of the sensor circuit. Also disclosed are a sensor arrangement and a use of a sensor.

11 Claims, 2 Drawing Sheets

(56) References Cited

U.S. PATENT DOCUMENTS

| | | | | |
|---|---|---|---|---|
| 6,476,520 B1* | 11/2002 | Bohm | ............... | H02H 9/008 |
| | | | | 340/538.17 |
| 2004/0113635 A1* | 6/2004 | Masuda | ............ | H02H 9/008 |
| | | | | 324/672 |
| 2008/0147336 A1* | 6/2008 | Karbula | ............. | G16Z 99/00 |
| | | | | 702/64 |
| 2009/0262473 A1* | 10/2009 | Weinert | ............. | H02H 9/008 |
| | | | | 361/56 |
| 2017/0256937 A1* | 9/2017 | Wiest | .................. | H03H 7/38 |

FOREIGN PATENT DOCUMENTS

| | | | |
|---|---|---|---|
| CN | 106257813 | A | 12/2016 |
| DE | 2913576 | A1 | 11/1979 |
| DE | 3014485 | A1 | 10/1981 |
| DE | 19719730 | C1 | 10/1998 |
| DE | 102005055546 | A1 | 5/2007 |
| DE | 102006030962 | A1 | 1/2008 |
| DE | 102006056175 | A1 | 5/2008 |
| DE | 102008053920 | A1 | 5/2010 |
| DE | 102015116608 | A1 | 3/2017 |
| EP | 0927982 | B1 | 5/2003 |
| WO | 2010049299 | A1 | 5/2010 |

* cited by examiner

SENSOR AND SENSOR ARRANGEMENT

CROSS-REFERENCE TO RELATED APPLICATIONS

The present application is related to and claims the priority benefit of German Patent Application No. 10 2018 120 878.2, filed on Aug. 27, 2018 and International Patent Application No. PCT/EP2019/070463 filed on Jul. 30, 2019, the entire contents of which are incorporated herein by reference.

TECHNICAL FIELD

The invention relates to a sensor, a sensor arrangement comprising same, the use of same and a method for operating same.

BACKGROUND

Sensors are known which are connected to a cable by means of an inductive interface. For example, products sold by the applicant under the name "Memosens" are known. The cable and the sensor form a unit and are certified only as a respective unit for an area with explosion risk. This is referred to as an ex-area. The ATEX product directive 2014/34/EU and the ATEX workplace directive 1999/92/EC are two sets of guidelines in the field of explosion protection. In the USA, there are similar regulations, such as the National Electrical Code (NEC). Areas at risk of explosion are divided into zones, for example in zones 0 and 1 for gases and 20 and 21 for dusts, according to the frequency and duration of the occurrence of a hazardous explosive atmosphere. When dealing with substances that can react with oxygen, an explosion risk must always be expected if the combustible substance is present in the air at a certain partial pressure or as fine-grained dust in a spatial volume. An explosive gas/air mixture is present when the fraction of the combustible gas or of an evaporated liquid is between the lower and upper explosion limits. In the case of dusts, a sufficiently low size of the dust grains and a minimum density must be present for the occurrence of an explosive atmosphere.

Devices that can be used in zones at risk of explosion are classified in various ways. One classification is for instance the temperature class or the ignition protection type. In this case, technical measures must ensure that no ignition source can act in accordance with the grouping of a supposed explosive mixture. Mention should be made here of the ignition protection type "intrinsic safety" or "Ex-i" (intrinsic safety).

As mentioned, only a specific combination of sensor and cable is permitted (certified) for the ex-area. The design, i.e. the selection of the components and the circuit itself, of the electronics on the side of the cable (referred to as the "primary side") and the electronics on the side of the sensor (referred to as the "secondary side") is carried out under this assumption. A fundamental assumption here is that both the primary side and the secondary side "know one another." The secondary-side input parameters, such as, for example, maximum voltage or maximum power, are predetermined and limited by the primary side.

The patent document DE 19719730 describes an inductive coupling, wherein a circuit on the primary side for limiting the power is disclosed. Furthermore, what is known as a monitoring circuit, which can adjust the power limiting circuits according to the characteristics of the secondary side determined by the monitoring circuit, is mentioned here. In this case, a signal is sent to the primary side by secondary-side measures which are not explained in more detail. In the case of a successfully recognized secondary side, which power limit is to be set is accordingly decided. For this purpose, a common database must exist between the monitoring circuit and the secondary side. The primary side and the secondary side must also "know" each other in this case. Here as well, the secondary-side input parameters are limited on the primary side.

Active control of the power limit is complex from an ex point of view. Many components and thus a very large amount of circuit board space are required. Furthermore, whether a certification authority for worldwide local ex-certifications would accept this technique is questionable.

In order to design and calculate the intrinsic safety of the primary side or secondary side, the other side must always be taken into account. Each side is always known to the other side.

SUMMARY

The object of the invention is to provide a sensor (secondary side) which can be technically considered from an ex-technical point of view independently of the cable circuit (primary side).

The object is achieved by a sensor, comprising: at least one sensor element, which detects at least one measurand, wherein the sensor element is in electrical contact with a sensor circuit; the sensor circuit, which processes values derived from data from a secondary coil and/or from the measurand, wherein the sensor circuit is in electrical contact with an ex-circuit, wherein the sensor circuit is supplied a maximum input voltage and a maximum input current; and the ex-circuit, comprising: the secondary coil, which receives an electrical signal from a primary coil associated with the secondary coil, wherein the electrical signal comprises the data which are impressed, in particular modulated, onto the electrical signal; a voltage limit, which limits the voltage of the electrical signal to the maximum input voltage of the sensor circuit; and a current limit, which limits the current of the electrical signal to the maximum input current of the sensor circuit.

In other words, the input parameters of the secondary side are also limited exclusively on the secondary side. The sensor can be used in the ex-area if the power delivered by the primary side is below or equal to a maximum input line of the secondary side. As a result, an ex-interface, so to speak, is put into the inductive coupling. The user does not need to worry about the ex-capability of the sensor arrangement (consisting of sensor and cable) except for this parameter, given the ex-capability of the cable and the sensor. The primary side of the coupling, especially the cable, is certified by a first ex-certificate. The maximum transmittable power is specified in this certificate. In a second certificate, the sensor(s) is certified by specifying the input power Pi. As a result, it is possible to use any desired combinations of sensor and cable, each of which has an ex-certificate. This is made possible by the ex-measures, i.e. in particular the ex-circuit, on the secondary side and the indication of a maximum power to be transmitted from the primary side to the secondary side, which is less than or equal to the maximum input power of the secondary side. Due to various possible voltage/current input characteristics of the sensor, for example a trapezoidal characteristic, the input power Pi cannot be calculated in every case from the product of the maximum input voltage and the maximum input current.

In one embodiment, the intrinsic safety of the sensor circuit is designed by means of the maximum input voltage and the maximum input current.

In one embodiment, the voltage limit is designed such that the functional requirements of the sensor circuit are not or are minimally disturbed. The voltage at the voltage limit is thus in the order of magnitude of the input voltage of the sensor circuit or the voltage at the voltage limit is somewhat greater than the input voltage of the sensor circuit.

In one embodiment, the voltage limit comprises at least one diode, preferably three diodes. In one embodiment, these are Z diodes which are operated in the reverse direction. The diode(s) are designed such that the reverse voltage, i.e. the voltage at the voltage limit, is higher than the input voltage of the sensor circuit. This is advantageous because, above a certain reverse voltage, the breakdown voltage, the current through the diode undesirably increases by many orders of magnitude and causes power dissipation. In one embodiment, the voltage limit is configured by means of a thyristor crowbar circuit.

In one embodiment, the current limit is configured as an internal resistance of the secondary coil.

In one embodiment, the current limit is configured as a resistor before and/or after the voltage limit.

In one embodiment, the sensor circuit comprises a second ex-circuit on the side facing away from the ex-circuit, wherein the second ex-circuit is configured as an output limiting circuit. The second ex-circuit as an output limit ensures that the normative intrinsic safety requirements of the sensor circuit in the direction of the sensor element are complied with. Furthermore, the output limiting circuit ensures that the normative intrinsic safety requirements of the sensor circuit are complied with if the sensor circuit can be damaged by errors in the sensor element.

In one embodiment, this second ex-circuit comprises limiting elements for limiting maximum current with a current limit and/or maximum voltage with a voltage limit and/or maximum power with a power limit.

In one embodiment, the second ex-circuit with the current limit is configured as a resistor.

In one embodiment, the second ex-circuit with the voltage limit is configured as a Z diode, preferably three Z diodes.

In one embodiment, the second ex-circuit with voltage limit is configured as a thyristor crowbar circuit.

The object is further achieved by the use of a sensor as described above in an area with explosion hazards, in particular in zone 0, 1, 20 or 21, or class I division 1 or class II division 1.

The object is further achieved by a sensor arrangement comprising: a sensor according to at least one of the preceding claims; and a cable of a first type comprising a cable circuit with the primary coil, wherein the primary coil transmits the electrical signal with a maximum power to the secondary coil.

In one embodiment, the sensor arrangement is configured for use in an area with explosion hazards. The cable and the sensor are thus located in the ex-area.

In one embodiment, the sensor arrangement comprises a cable of a second type instead of the cable of the first type, and the sensor arrangement is configured for use in an area with explosion hazards. By virtue of the fact that the sensor per se can be considered from an ex-technical point of view and comprises ex-measures, in particular the ex-circuit, on its side, different cables can be connected to the sensor. What is meant are cables of various types. Each combination of sensor and cable per se need not be ex-certified. The sensor or the cable can be exchanged in the ex-environment. One does not have to go into a non-ex-area to exchange it.

The object is further achieved by a method for operating a sensor in an area with explosion hazards, comprising the following steps: transmitting an electrical signal, wherein the electrical signal is transmitted at a maximum power, to a secondary coil of the sensor; limiting the voltage of the electrical signal to a maximum value, wherein the limiting occurs in the sensor; and limiting the current of the electrical signal to a maximum value, wherein the limiting occurs in the sensor.

BRIEF DESCRIPTION OF THE DRAWINGS

This is explained in more detail with reference to the following figures.

In the figures, the same features are identified by the same reference signs.

DETAILED DESCRIPTION

As mentioned, the object is to decouple the secondary side from the primary side from an ex-technical point of view. This is achieved by limiting the input parameters of the secondary side on the secondary side itself. Under this condition, it is possible to "place" an ex-interface directly into the inductive coupling.

In principle, a device can be certified as an "intrinsically safe device" in two different ways: as a system or via parameters. In a certification via the system per se, the inspection authority (certification authority) specifies each component and then assesses the entire system. Deviation of a component from the corresponding standard results in termination of the approval. In contrast, a parametric approval is one in which the inspection authority individually assesses each device per se and assigns it a set of safety or so-called entity parameters.

For the inductive coupling by means of a primary coil L1 and a secondary coil L2, the output power Po at the primary coil L1 or the input power Pi at the secondary coil L2 can be used as an entity parameter, because the power transmission as such is measurable and constant. The following applies: $Pi \geq Po$. This means that the cable electronics (primary side) have a maximum output power Po and the sensor electronics have a corresponding input power Pi. The output power Po of the cable electronics is independent of the secondary side and is also determined or calculated without this. The input power Pi of the sensor electronics is oriented towards the output power Po and is at least the same as or greater than the output power Po. The maximum output power Po is thus less than the input power Pi.

Figure 1:
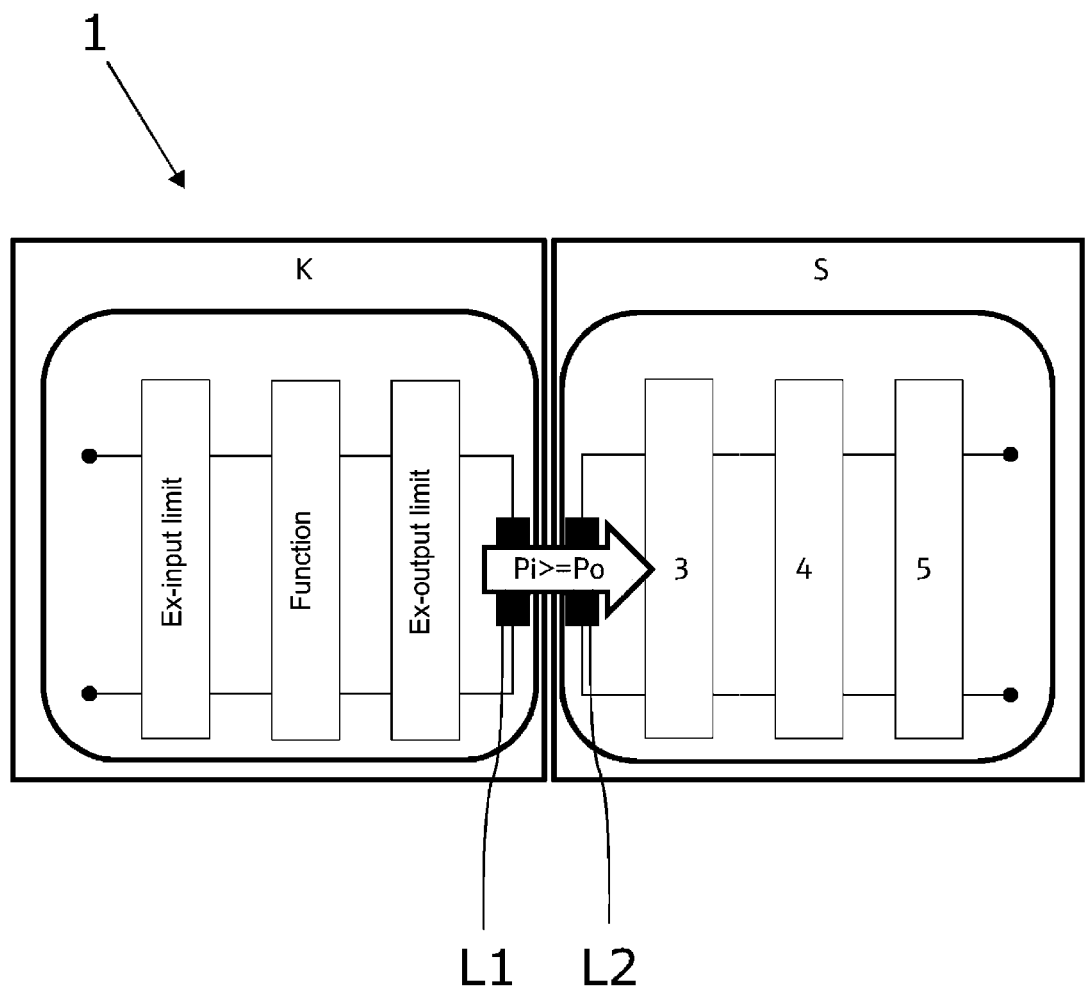
FIG. 1 shows a schematic overview of the claimed sensor arrangement.

FIG. 1 shows the schematic overview of the sensor arrangement with the cable side K, which corresponds to the primary side P, and the sensor side S, which corresponds to the secondary side. Through an ex-circuit 3 on the secondary side, the effect that the secondary side S, i.e. the sensor, can be used in the ex-area is only achieved by secondary-side measures.

The exclusively sensor-side consideration of all functional and Ex-technical parameters allows, for example, the number of windings or the type of secondary coil to be adapted to the sensor-specific conditions. Thus, the number of windings can be reduced to reduce, for example, the power dissipation while stabilizing the secondary DC voltage. It is also conceivable to use a secondary coil with a center tap, in order to potentially optimize the energy decrease for the positive and negative half-wave or decouple it from the communication. These measures result in an optimization of the actual sensor functionality and thus enable a more accurate or precise measurement of the primary measurand (pH, conductivity, etc.) and/or the secondary measurand (temperature, etc.). This is achieved because more scans for digitizing the measurand are possible, higher computing power of the microcontroller used (e.g. through higher processor clocking) is possible, more accurate and/or lower-noise op-amps can be used, a higher measuring current can be fed and higher circuitry complexity can be driven.

From the perspective of the sensor (seen in the direction of the cable), the primary side is unknown. This means that both functional parameters (e.g. winding ratio) and ex-technical parameters have to be treated or limited on the sensor electronics. The following limiting circuit parts must be present in order for further calculation of the intrinsic safety of the sensor to be able to take place: Voltage limit and current limit.

Figure 2:
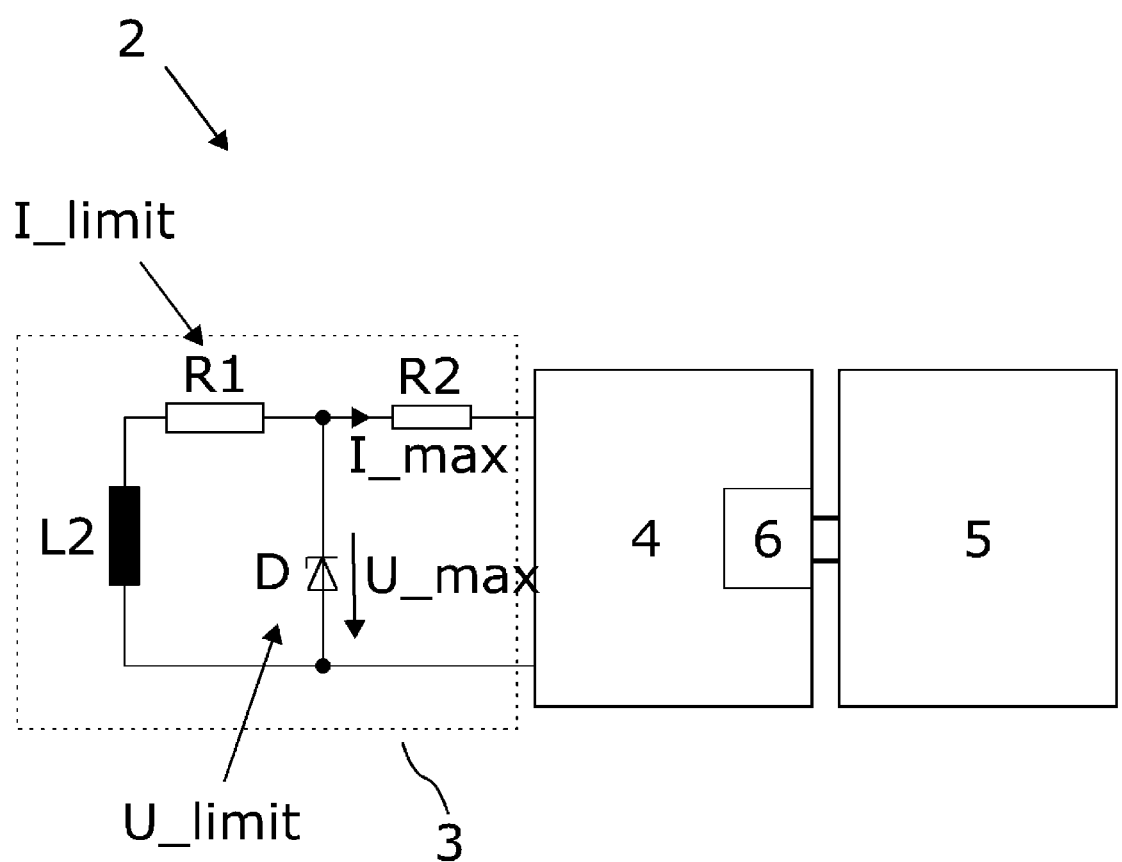
FIG. 2 shows a schematic overview of the claimed sensor.

FIG. 2 shows schematically how and where the ex limiting circuits are arranged. The secondary coil L 2 receives an electrical signal from the primary side P. The limiting circuit 3 limit this electrical signal to fixed values so that defined maximum values for voltage U_max and current I_max are supplied to the sensor circuit 4. These maximum values are further required to calculate the intrinsic safety of the sensor circuit 4.

The sensor circuit 4 comprises the functional part of the sensor 2. For this purpose, the circuit comprises approximately one or more microcontrollers and one or more storage devices. The sensor circuit 4 also comprises a modulator and/or a demodulator. With this, data are impressed, for instance modulated, onto the electrical signal, or data from the electrical signal are demodulated.

The sensor circuit 4 comprises a second ex-circuit 6, which limits the sensor circuit 4 on the output side. The ex-circuit 6 comprises at least one current limit and/or a voltage limit. The second ex-circuit 6 as an output limit ensures that the normative intrinsic safety requirements of the sensor circuit in the direction of the sensor element are complied with. Furthermore, the output limiting circuit ensures that the normative intrinsic safety requirements of the sensor circuit are complied with if the sensor circuit can be damaged by errors in the sensor element. Embodiments of the ex-circuit 6 comprise a resistor, one or three Z diodes or a thyristor crowbar circuit.

The sensor element 5 is configured to detect a measurand. This may be, for example, the pH or the conductivity. Further characteristic values are, for instance, the redox potential, the absorption of electromagnetic waves in the medium, for example with wavelengths in the UV, IR and/or visible range, oxygen concentration, turbidity, concentration of non-metallic materials, among other things. Other measured values, such as the temperature, that are necessary for the correct determination of this value are also intended to fall under the term "sensor element 5."

The current limit I_limit may be an independent component, e.g. a resistor R1 or R2 or R1 and R2, arranged "before" or "after" the voltage limit. The resistor R1, R2 is thus connected in series with the secondary coil L2. If only one resistor R1 or R2 is used, it can be arranged before or after the node for the voltage limit U_limit. Alternatively or additionally, the internal resistance of the secondary coil L2 can also be used for this purpose if the coil is a non-susceptible component according to the ex-standard. The maximum current I_max results from the calculation:

$$I_{max} = \frac{Pi}{R}$$

Here, the variable "R" in the formula is the sum of all resistances, for instance R1+R2+R_(internal resistance of the coil L2).

In the simplest case, the voltage limit U_limit can be implemented with a Z diode circuit D. Three parallel-connected diodes are preferably used. Here, the maximum voltage results from the Z voltage plus tolerances (e.g. component, temperature). The Z diodes are designed such that the reverse voltage, i.e. the voltage at the voltage limit, is higher than the input voltage of the sensor circuit 4. This is advantageous because, above a certain reverse voltage, the breakdown voltage, the current through the diode undesirably increases by many orders of magnitude and causes power dissipation.

However, other circuit designs are also possible, such as, for example, a crowbar circuit (when an overvoltage is detected, a transverse path is immediately opened and the voltage is drawn toward 0 V).

This results in an independent ex-design on the sensor side as long as the output power is below the input power.

Changes to standard parameters, such as, for example, the winding ratio of the coils L1, L2, are thus possible even under ex-conditions.

Each individual sensor type can be technically optimized for its task without regard to existing parameter sets.

Furthermore, all sensors which are permitted in the ex-area can be connected to a primary side. In this case, it does not matter who the manufacturer of the sensor is.

The invention claimed is:
1. A sensor, comprising:
    a sensor element embodied to detect a measurand;
    a sensor circuit, including:
        a microcontroller and an associated memory; and
        a modulator/de-modulator circuit,
        wherein the sensor circuit is in electrical contact with the sensor element and is configured to process values derived from the measurand, and
        wherein the sensor circuit has a maximum input voltage and a maximum input current; and
    an ex-circuit including:
        a secondary coil embodied to detachably connect with a primary coil and thereby form an inductive coupling with the primary coil, wherein the inductive coupling forms an ex-interface to decouple the sensor circuit ex-technically from the cable, wherein the ex-circuit is configured to receive an electrical signal via the inductive coupling, wherein the electrical signal includes data modulated onto the electrical signal;
        a voltage limiter embodied to limit a voltage of the electrical signal to the maximum input voltage of the sensor circuit; and
        a current limiter embodied to limit a current of the electrical signal to the maximum input current of the sensor circuit,
        wherein the ex-circuit is configured to supply the voltage-limited and current-limited electrical signal to the sensor circuit, wherein the sensor circuit is further configured to de-modulate the data from the electrical signal and to modulate measurand data onto the electrical signal.

2. The sensor according to claim 1, wherein an intrinsic safety of the sensor circuit is designed by means of the maximum input voltage and the maximum input current.

3. The sensor according to claim 1, wherein the voltage limiter of the ex-circuit includes at least one diode.

4. The sensor according to claim 1, wherein the voltage limiter of the ex-circuit is configured by means of a thyristor crowbar circuit.

5. The sensor according to claim 1, wherein the current limiter of the ex-circuit is configured as an internal resistance of the secondary coil.

6. The sensor according to claim 1, wherein the current limiter of the ex-circuit is configured as a resistor before and/or after the voltage limiter.

7. The sensor according to claim 1, wherein the sensor circuit further includes a second ex-circuit on a side facing away from the ex-circuit, wherein the second ex-circuit is configured as an output limiter.

8. The sensor according to claim 1, wherein the sensor is embodied to be used in an area with explosion hazards, including zone 0, 1, 20, or 21 or class I division 1 or class II division 1.

9. A sensor arrangement, comprising:
a sensor, including:
  a sensor element embodied to detect a measurand;
  a sensor circuit, including:
    a microcontroller and an associated memory; and
    a modulator/de-modulator circuit,
    wherein the sensor circuit is in electrical contact with the sensor element and is configured to process values derived from the measurand, and
    wherein the sensor circuit has a maximum input voltage and a maximum input current; and
  an ex-circuit including:
    a secondary coil embodied to detachably connect with a primary coil and thereby form an inductive coupling with the primary coil, wherein the inductive coupling forms an ex-interface to decouple the sensor circuit ex-technically from the cable, wherein the ex-circuit is configured to receive an electrical signal via the inductive coupling, wherein the electrical signal includes the data that are modulated onto the electrical signal;
    a voltage limiter embodied to limit a voltage of the electrical signal to the maximum input voltage of the sensor circuit; and
    a current limiter embodied to limit a current of the electrical signal to the maximum input current of the sensor circuit,
    wherein the ex-circuit is configured to supply the voltage-limited and current-limited electrical signal to the sensor circuit,
  wherein the sensor circuit is further configured to de-modulate the data from the electrical signal and to modulate measurand data onto the electrical signal; and
a cable of a first type, including a cable circuit including the primary coil, wherein the cable is embodied to detachably connect with the sensor such that the primary coil and the secondary coil form the inductive coupling, wherein the primary coil transmits the electrical signal at a maximum power to the secondary coil via the inductive coupling, and wherein the inductive coupling forms the ex-interface to decouple the sensor circuit ex-technically from the cable.

10. The sensor arrangement according to claim 9, wherein the sensor arrangement is configured for use in an area with explosion hazards.

11. The sensor arrangement according to claim 9, wherein the sensor arrangement comprises a cable of a second type instead of the cable of the first type, and the sensor arrangement is configured for use in an area with explosion hazards.

* * * * *

UNITED STATES PATENT AND TRADEMARK OFFICE
CERTIFICATE OF CORRECTION

Page 1 of 1

PATENT NO. : 11,982,548 B2
APPLICATION NO. : 17/271804
DATED : May 14, 2024
INVENTOR(S) : Scheibe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 549 days.

Signed and Sealed this
Twelfth Day of August, 2025

Coke Morgan Stewart
*Acting Director of the United States Patent and Trademark Office*